(12) United States Patent
Aoki et al.

(10) Patent No.: US 7,096,280 B2
(45) Date of Patent: Aug. 22, 2006

(54) DATA OUTPUT CONTROLLER

(75) Inventors: Mikio Aoki, Suwa (JP); Shinya Taniguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 655 days.

(21) Appl. No.: 09/892,886

(22) Filed: Jun. 28, 2001

(65) Prior Publication Data

US 2002/0002592 A1    Jan. 3, 2002

Related U.S. Application Data

(63) Continuation of application No. PCT/JP00/07717, filed on Nov. 1, 2000.

(30) Foreign Application Priority Data

Nov. 1, 1999    (JP)    ............................... H11-311598

(51) Int. Cl.
 *G06F 15/16*    (2006.01)
(52) U.S. Cl. ...................... 709/246; 709/203; 709/211; 709/216; 709/228; 709/232; 712/225; 358/1.15; 358/1.18
(58) Field of Classification Search ................ 709/217, 709/205, 226, 213, 229, 200, 203, 211, 216, 709/232, 246, 228; 342/457; 358/1.15, 358/1.18; 712/225
See application file for complete search history.

(56) References Cited

U.S. PATENT DOCUMENTS

| | | | | |
|---|---|---|---|---|
| 5,559,933 A | * | 9/1996 | Boswell | ...................... 358/1.15 |
| 5,862,321 A | * | 1/1999 | Lamming et al. | ........... 709/200 |
| 5,997,193 A | * | 12/1999 | Petterutti et al. | ............. 400/88 |
| 6,076,110 A | * | 6/2000 | Murphy et al. | ............. 709/228 |
| 6,160,629 A | * | 12/2000 | Tang et al. | ................... 358/1.1 |
| 6,226,098 B1 | * | 5/2001 | Kulakowski et al. | ...... 358/1.14 |
| 6,259,405 B1 | * | 7/2001 | Stewart et al. | .............. 342/457 |
| 6,498,656 B1 | * | 12/2002 | Mastie et al. | .............. 358/1.15 |

FOREIGN PATENT DOCUMENTS

| | | |
|---|---|---|
| CN | 1233897 A | 11/1999 |
| EP | 0 954 147 A2 | 3/1999 |
| EP | 0 930 757 A1 | 7/1999 |
| JP | A-10-191453 | 7/1998 |
| JP | A-10-222527 | 8/1998 |
| JP | A-10-333845 | 12/1998 |

(Continued)

*Primary Examiner*—Saleh Najjar
*Assistant Examiner*—Michael Won
(74) *Attorney, Agent, or Firm*—Oliff & Berridge, PLC

(57) ABSTRACT

An objective of the present invention is to provide a data output controller ideally suited for easily obtaining detailed information available on a network.

A data output control terminal 300 is communicably connected to a portable terminal 100 possessed by a user, printing devices $PR_1$ through $PR_n$ distributed and installed at various locations, and WWW servers $DS_1$ through $DS_m$ via the Internet 400, acquires data regarding a data print request from the portable terminal 100 from the WWW servers DS, selects a printing device PR, which is considered to be optimum for the user of the portable terminal 100 to receive provided output data, from among a plurality of printing devices PR, and outputs the acquired data to the selected printing device PR. Regarding the selection of a printing device PR, data on a printing device position is retrieved from the storage device 62 on the basis of, for example, data on a desired providing area indicating a desired providing area where output data is desired to be provided, and a printing device PR located in an area specified by the data on a desired providing area is selected.

16 Claims, 6 Drawing Sheets

FOREIGN PATENT DOCUMENTS

| | | |
|---|---|---|
| JP | A-11-154218 | 6/1999 |
| WO | WO 98/47295 | 10/1998 |
| WO | WO 99/00968 | 1/1999 |

* cited by examiner

DATA OUTPUT CONTROLLER

This is a Continuation of Application No. PCT/JP00/07717 filed Nov. 1, 2000.

BACKGROUND OF THE INVENTION

1. Field of Invention

The present invention relates to an apparatus that is communicably connected, via a network, to a portable terminal carried by a user and a plurality of printing devices distributed and installed at various locations, receives a data print request from the portable terminal, and outputs data regarding the data print request to one of the printing devices, and a method therefor. More particularly, the present invention relates to a data output controller ideally suited for easily obtaining detailed information available on a network.

2. Description of Related Art

In recent years, information available on the Internet can be easily obtained from anywhere by using, for example, "i mode" (registered trade name) provided by NTT Mobile Communication Networks, Inc. (NTT DoCoMo).

However, although such a portable terminal enables information available on the Internet to be easily obtained from anywhere, the information displayed is considerably simpler than that displayed on a typical personal computer because the display of the portable terminal is inevitably designed to have a simple configuration for the purpose of achieving more compactness and reduced power consumption of the portable terminal. Hence, such a portable terminal does not provide information that fully satisfies a user thereof.

Therefore, a device can be provided in which a portable terminal and a printing device are combined so as to display rough information on the portable terminal, and to print detailed information on the printing device to thereby provide detailed information, while maintaining the compactness and reduced power consumption of the portable terminal. However, this device that combines the portable terminal and the printing device has to solve some technological problems.

For example, it is difficult to carry a printing device together with a portable terminal because of its big size, and therefore, it is conceivable to use a printing device that is typically installed at home or an office to print out detailed information. It is not possible, however, to easily obtain information from anywhere if a fixed particular printing device has to be used. To implement this idea, the printing device has to be made small enough to be portable, or an arrangement has to be made that allows an arbitrary printing device to be used. The concept of the former case is extremely difficult to realize with presently available technology, so that it is unrealistic. In the latter case, a driver dedicated to each type of printing device would be required, so that a portable terminal would have to incorporate drivers for all types of printing devices to be used. This is also unrealistic.

SUMMARY OF THE INVENTION

Accordingly, the present invention overcomes the above problems with the conventional technology, and it is an object thereof to provide a data output controller ideally suited for obtaining detailed information available on a network with ease.

To achieve the above objects, a data output controller described in accordance with another aspect of the present invention allows a user to receive provided output data with greater ease and therefore to obtain detailed information available on a network more easily. This provides an advantage in that a service provider will be able to provide users thereof with information services that are highly satisfactory to the users, as compared with the conventional technology.

Furthermore, according to the data output controller in accordance with another aspect of the present invention, data regarding a data print request is printed out by an output terminal considered to be the closest distance-wise or timewise when the position of a portable terminal is used as the reference. Hence, users will be able to receive provided output data with greater ease and to obtain detailed information available on a network more easily. This provides another advantage in that a service provider will be able to provide information services that are even more satisfactory to the users thereof.

Furthermore, according to the data output controller in accordance with another aspect of the present invention, data regarding a data print request is printed out by an output terminal located in a desired providing area, which is an approximate place where a user wishes to receive the provided output data. Thus, output data can be provided in a manner that meets users' needs, and detailed information available on a network can be obtained with even greater ease. This provides another advantage in that a service provider will be able to provide information services that are even more satisfactory to the users thereof.

Furthermore, according to the data output controller in accordance with another aspect of the present invention, if a user inputs an area where the user wishes to receive provided output data, then the priority is given to the search based on the data on the desired providing area rather than the search based on the data on the position of a portable terminal, and the data regarding the data print request will be printed out by an output terminal located in the desired providing area. Thus, priority is given to the needs of the user in providing output data, allowing detailed information available on a network to be obtained with further greater ease. This provides another advantage in that a service provider will be able to provide information services that are even more satisfactory to the users thereof.

Furthermore, according to the data output controller in accordance with another aspect of the present invention, data regarding a data print request is printed out by an output terminal capable of printing in a data format specified by a user. Thus, output data can be provided in a manner that meets users' needs, and detailed information available on a network can be obtained with even greater ease. This provides another advantage in that a service provider will be able to provide information services that are even more satisfactory to the users.

Furthermore, according to the data output controller in accordance with another aspect of the present invention, data regarding a data print request is printed out by an output terminal capable of printing based on a printing specification designated by a user. Thus, output data can be provided in a manner that meets users' needs, and detailed information available on a network can be obtained with even greater ease. This provides another advantage in that a service provider will be able to provide information services that are even more satisfactory to the users.

Furthermore, according to the data output controller in accordance with another aspect of the present invention, data regarding a data print request is printed out by an output terminal uniquely specified by a user. Thus, output data can be provided in a manner that meets users' needs, and detailed information available on a network can be obtained with even greater ease. This provides another advantage in that a service provider will be able to provide information services that are even more satisfactory to the users thereof.

Furthermore, according to the data output controller in accordance with another aspect of the present invention, a user is notified of the information regarding an output terminal that will provide output data, making it possible to prevent the user from printing wrong data. This provides another advantage in that a service provider will be able to provide information services that are even more satisfactory to the users thereof.

Furthermore, the data output controller in accordance with another aspect of the present invention enables users to receive provided output data more easily, and to obtain detailed information available on a network with greater ease, as compared with the conventional technology. Hence, an advantage can be obtained in that a service provider will be able to furnish users thereof with information services that will give even more satisfaction to the users.

Furthermore, according to the data output controller in accordance with another aspect of the present invention, the data regarding a request to output data is output at an output terminal considered to be the closest distance-wise or time-wise, using the position of a portable terminal as the reference. Hence, a user will be able to receive provided output data more easily, and to obtain detailed information available on a network with greater ease. This provides another advantage in that a service provider will be able to provide information services that are even more satisfactory to the users.

Furthermore, according to the data output controller in accordance with another aspect of the present invention, data regarding a request to output data is output at an output terminal located in a desired providing area, which is an approximate place where a user wishes to receive the provided output data. Thus, output data can be provided in a manner that meets users' needs, and detailed information available on a network can be obtained with even greater ease. This provides another advantage in that a service provider will be able to provide information services that are even more satisfactory to the users thereof.

Furthermore, according to the data output controller in accordance with another aspect of the present invention, if a user inputs an area where the user wishes to receive provided output data, then the priority is given to the search based on the data on the desired providing area rather than the search based on the data on the position of a portable terminal, and the data regarding a request to output data will be output at an output terminal located in the desired providing area. Thus, priority is given to the needs of the user in providing output data, allowing detailed information available on a network to be obtained with further greater ease. This provides another advantage in that a service provider will be able to provide information services that are even more satisfactory to the users thereof.

Furthermore, according to the data output controller in accordance with another aspect of the present invention, data regarding a request to output data is output at an output terminal capable of outputting in a data format specified by a user. Thus, output data can be provided in a manner that meets users' needs, and detailed information available on a network can be obtained with even greater ease. This provides another advantage in that a service provider will be able to provide information services that are even more satisfactory to the users thereof.

Furthermore, according to the data output controller in accordance with another aspect of the present invention, data regarding a request to output data is output at an output terminal capable of outputting according to an output specification designated by a user. Thus, output data can be provided in a manner that meets users' needs, and detailed information available on a network can be obtained with even greater ease. This provides another advantage in that a service provider will be able to provide information services that are even more satisfactory to the users thereof.

Furthermore, according to the data output controller in accordance with another aspect of the present invention, data regarding a request to output data is output at an output terminal uniquely specified by a user. Thus, output data can be provided in a manner that meets users' needs, and detailed information available on a network can be obtained with even greater ease. This provides another advantage in that a service provider will be able to provide information services that are even more satisfactory to the users thereof.

Furthermore, according to the data output controller in accordance with another aspect of the present invention, a user is notified of the information regarding an output terminal that will provide output data, making it possible to prevent the user from outputting wrong data. This provides another advantage in that a service provider will be able to provide information services that are even more satisfactory to the users thereof.

DETAILED DESCRIPTION OF PREFERRED EMBODIMENTS

Figure 1:
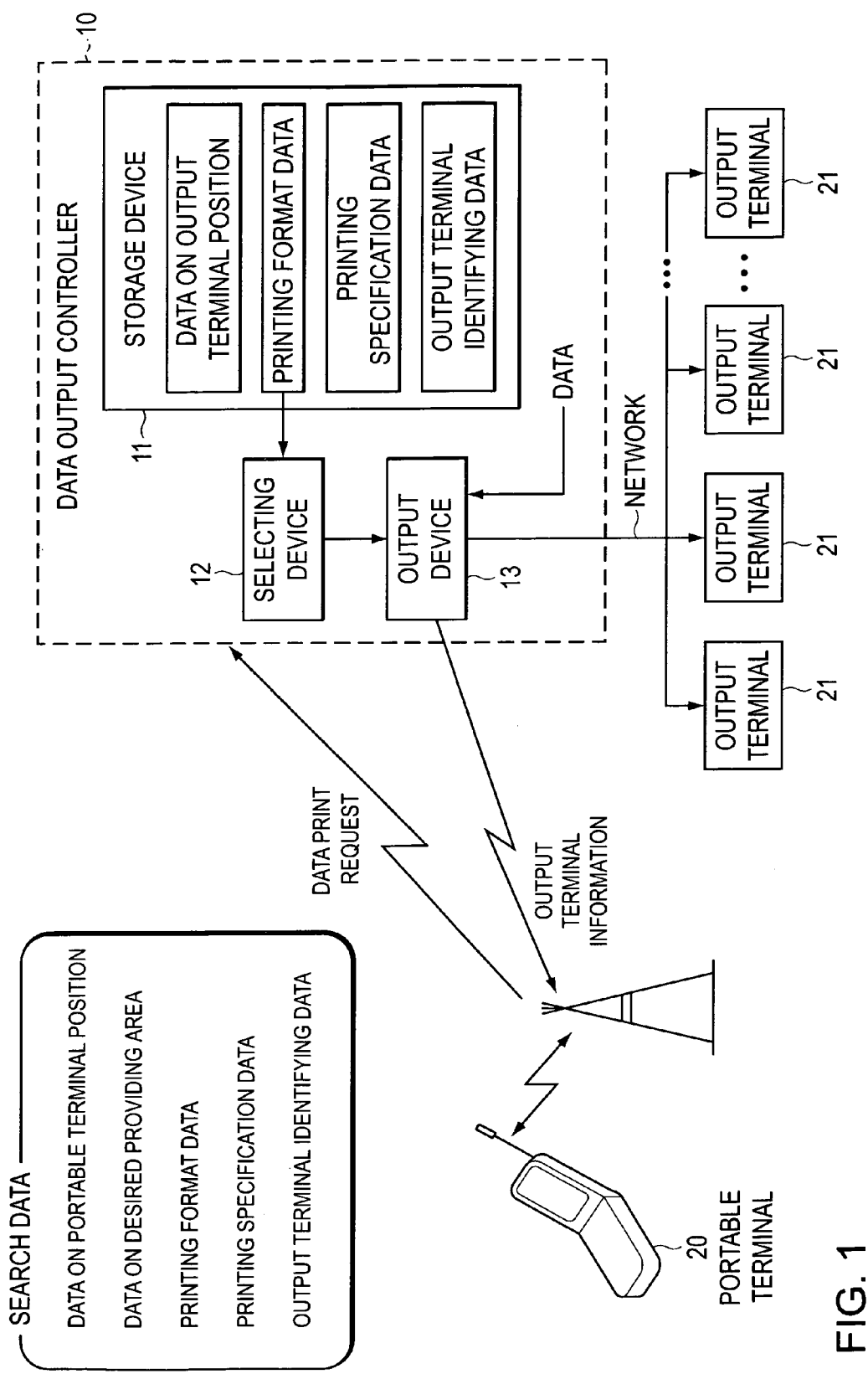
FIG. 1 is a schematic showing the configuration of a data output controller in accordance with the present invention.

A data output controller in accordance with the present invention is described with reference to FIG. 1. FIG. 1 is a schematic showing the configuration of the data output controller in accordance with the present invention.

A data output controller 10 in accordance with the present invention is, as shown in FIG. 1, is communicably connected, via a network, to a portable terminal 20 that is possessed by a user, issues a data print request, and features portability, and a plurality of output terminals 21 that are distributed and installed at various locations to print data. The data output controller 10 receives the data print request from the portable terminal 20, and outputs data regarding the data print request to the output terminals 21. The data output controller 10 is equipped with a storage device 11 that stores output terminal information regarding the output terminals 21 for each of the output terminals 21, a selecting device 12 that selects one of the plurality of output terminals 21, and an output device 13 that outputs the data regarding the data print request to the output terminal 21 selected by the selecting device 12. The data print request includes search data necessary for the selecting device 12 to select the output terminal 21. The selecting device 12 retrieves output terminal information from the storage device 11 on the basis of the search data contained in the data print request so as to select the output terminal 21 considered to be the best suited for the user of the portable terminal 20 to receive provided output data.

With this arrangement, upon receipt of the data print request from the portable terminal 20, the selecting device 12 retrieves output terminal information from the storage device 11 on the basis of the search data contained in the data print request in order to select an output terminal 21 considered to be the best suited for the user of the portable terminal 20 to receive provided output data, and data regarding the data print request is output by the output device 13 to the selected output terminal 21. Then, the data is printed out by the output terminal 21.

The output terminal 21 considered to be ideally suited for the user of the portable terminal 20 to receive provided output data may be, for example, an output terminal 21 considered to be the closest distance-wise or time-wise, taking the position of the portable terminal 20 as the reference, an output terminal 21 considered to be the closest distance-wise or time-wise, taking a destination of the user of the portable terminal 20 as the reference, an output terminal 21 considered to enable the user to receive provided output data most quickly time-wise, considering a data output speed of the output terminal 21, or an output terminal 21 that is the lowest in price for receiving the provided output data.

The data regarding the data print request may be obtained by receiving it from, for example, the portable terminal 20, or from somewhere other than the controller 10 and the portable terminal 20. In the latter case, to be more specific, the following configuration may be possible. An acquiring device is provided that is communicably connected, via a network, to a data accumulating terminal to acquire data regarding the data print request from the data accumulating terminal. The output device 13 outputs the data acquired by the acquiring device to an output terminal selected by the selecting device 12.

With this arrangement, if a data print request is received from the portable terminal 20, data regarding the data print request is acquired by the acquiring device from the data accumulating terminal, and the acquired data is output to the output terminal 21 selected by the selecting device 12.

Furthermore, according to the data output controller 10 in accordance with another aspect of the present invention, as shown in FIG. 1, in the data output controller 10, the output terminal information includes output terminal position data that determines the location where the output terminal 21 is installed, and the search data may include portable terminal position data that determines the position of the portable terminal 20. The selecting device 12 retrieves the output terminal position data from the storage device 11 on the basis of the data on a portable terminal position contained in the search data, and selects an output terminal 21 considered to be the closest distance-wise or time-wise, taking the position of the portable terminal 20 as the reference.

With this arrangement, if the search data includes the data on the position of a portable terminal, then the output terminal position in the storage device 11 is retrieved by the selecting device 12 on the basis of the data on a portable terminal position that is contained in the data print request, and the output terminal 21 considered to be the closest distance-wise or time-wise is selected, taking the position of the portable terminal 20 as the reference.

In this case, the selecting device 12 may have any configuration as long as it is adapted to select an output terminal 21 considered to be the closest distance-wise or time-wise, taking the position of the portable terminal 20 as the reference. The selecting device 12 may be adapted to select any one of the output terminals 21 considered to be the closest distance-wise or time-wise, taking the position of the portable terminal 20 as the reference, or to select a plurality of the output terminals 21 considered to be the closest distance-wise or time-wise, taking the position of the portable terminal 20 as the reference. In the latter case, some method/device, such as designation by a user, is employed to narrow down to eventually select one of the plurality of output terminals 21.

The data on a position of the portable terminal may be obtained, for example, by measuring the position of the portable terminal 20 by the controller 10, or by measuring the position thereof by the portable terminal 20 by utilizing GPS or the like, or by measuring the position of the portable terminal 20 at a base station to which the portable terminal 20 is connected.

Furthermore, according to the data output controller 10 in accordance with another aspect of the present invention, as shown in FIG. 1, in the data output controller 10, the output terminal information includes data on an output terminal position that determines a location where the output terminal 21 is located, and the search data may include data on a desired providing area that indicates a desired providing area, which is an approximate place where output data is desired to be provided. Based on the data on a desired providing area, which data is included in the search data, the selecting device 12 retrieves the data on an output terminal position from the storage device 11, and selects the output terminal 21 located in the area specified by the data on a desired providing area.

With this arrangement, if the search data includes the data on a desired providing area, then the selecting device 12 retrieves the data on an output terminal position from the storage device 11 on the basis of the data on a desired providing area that is contained in the data print request, and selects the output terminal 21 located in the area specified by the data on a desired providing area.

In this case, the selecting device 12 may have any configuration as long as it is adapted to select an output terminal 21 located in the area specified by the data on a desired providing area. The selecting device 12 may be adapted to select any one of the output terminals 21 located in an area specified by the data on a desired providing area, or select all output terminals 21 located in an area specified by the data on a desired providing area. In the latter case, some method/device, such as designation by a user, is used to narrow down to eventually select one of the plurality of output terminals 21.

Furthermore, according to the data output controller 10 in accordance with another aspect of the present invention, as shown in FIG. 1, in the data output controller 10, the selecting device 12 does not perform the search based on the data on a portable terminal position if the position specified by the data on a portable terminal position is not included in the area specified by the data on a desired providing area that is included in the search data.

With this arrangement, the search based on the data on a portable terminal position will not be performed by the selecting device 12 if the position specified by the data on a portable terminal position is not included in the area specified by the data on a desired providing area that is included in the search data.

Furthermore, according to the data output controller 10 in accordance with another aspect of the present invention, as shown in FIG. 1, in the data output controller 10, the output terminal information includes printing format data indicating a data format that can be printed by the output terminal 21 among data formats of data regarding the data print request, and the search data may include the printing format data. The selecting device 12 is adapted to retrieve printing format data from the storage device 11 on the basis of the printing format data included in the search data, and to select the output terminal 21 associated with the printing format data.

With this arrangement, if printing format data is included in search data, then the selecting device 12 retrieves printing format data from the storage device 11 on the basis of the printing format data included in a data print request, and selects the output terminal 21 associated with the printing format data.

In this case, the selecting device 12 may have any configuration as long as it is adapted to select an output terminal 21 associated with printing format data. The selecting device 12 may be adapted to select any one of the output terminals 21 associated with printing format data, or select all output terminals 21 associated with printing format data. In the latter case, some method/device, such as designation by a user, is used to narrow down to eventually select one of the plurality of output terminals 21.

Furthermore, according to the data output controller 10 in accordance with another aspect of the present invention, as shown in FIG. 1, in the data output controller 10 described, the output terminal information includes printing specification data indicating the printing specification of the output terminal 21, and the search data may include the printing specification data. The selecting device 12 is adapted to retrieve printing specification data from the storage device 11 on the basis of the printing specification data included in the search data, and to select the output terminal 21 associated with the printing specification data.

With this arrangement, if printing specification data is included in search data, then the selecting device 12 retrieves printing specification data in the storage device 11 on the basis of the printing specification data included in a data print request, and selects the output terminal 21 associated with the printing specification data.

In this case, the selecting device 12 may have any configuration as long as it is adapted to select an output terminal 21 associated with printing specification data. The selecting device 12 may be adapted to select any one of the output terminals 21 associated with printing specification data, or select all output terminals 21 associated with printing specification data. In the latter case, some method/device, such as designation by a user, is used to narrow down to eventually select one of the plurality of output terminals 21.

Furthermore, according to the data output controller 10 in accordance with another aspect of the present invention, as shown in FIG. 1, in the data output controller 10, the output terminal information includes output terminal identifying data that identifies the output terminals 21, and the search data may include the output terminal identifying data. The selecting device 12 is adapted to retrieve output terminal identifying data from the storage device 11 solely on the basis of the output terminal identifying data included in the search data, and to select the output terminal 21 that coincides with the output terminal identifying data.

With this arrangement, if search data includes printing device identifying data, then the selecting device 12 does not perform search based on any data other than printing device identifying data among the search data. The selecting device 12 retrieves printing device identifying data from the storage device 11 solely on the basis of the printing device identifying data included in the data print request so as to select the output terminal 21 that coincides with the printing device identifying data.

Furthermore, according to the data output controller 10 in accordance with another aspect of the present invention, as shown in FIG. 1, in the data output controller 10, the output device 13 outputs output terminal information corresponding to the output terminal 21 selected by the selecting device 12 to the portable terminal 20.

With this arrangement, the output terminal information corresponding to the output terminal 21 selected by the selecting device 12 is output by the output device 13 to the portable terminal 20.

Furthermore, the data output controller 10 in accordance with another aspect of the present invention is, as shown in FIG. 1, an apparatus that is communicably connected, via a network, with a portable terminal 20 that is possessed by a user, issues a data output request, and features portability, and a plurality of output terminals 21 that are distributed and installed at various locations to output data. The data output controller 10 receives a data output request from the portable terminal 20, and outputs data regarding the data output request to the output terminals 21. The data output controller 10 is equipped with a storage device 11 that stores output terminal information regarding the output terminals 21 for each of the output terminals 21, a selecting device 12 that selects one of the plurality of output terminals 21, and an output device 13 that outputs the data regarding the data output request to the output terminal 21 selected by the selecting device 12. The data output request includes search data necessary for the selecting device 12 to select the output terminal 21. The selecting device 12 retrieves output terminal information from the storage device 11 on the basis of the search data contained in the data output request so as to select the output terminal 21 considered to be the best suited for the user of the portable terminal 20 to receive provided output data.

With this arrangement, upon receipt of a data output request from the portable terminal 20, the selecting device 12 retrieves output terminal information from the storage device 11 on the basis of the search data contained in the data output request in order to select an output terminal 21 considered to be the best suited for the user of the portable terminal 20 to receive provided output data, and data regarding the data output request is output by the output device 13 to the selected output terminal 21. Then, the data is output by the output terminal 21.

The output terminal 21 considered to be ideally suited for the user of the portable terminal 20 to receive provided output data may be, for example, an output terminal 21 considered to be the closest distance-wise or time-wise, taking the position of the portable terminal 20 as the reference, an output terminal 21 considered to be the closest distance-wise or time-wise, taking a destination of the user of the portable terminal 20 as the reference, an output terminal 21 considered to enable the user to receive provided output data most quickly time-wise, considering a data output speed of the output terminal 21, or an output terminal 21 that is the lowest in price for receiving the provided output data.

The output terminal 21 may have any configuration as long as it is adapted to output data. Such an output terminal 21 may be equipped with, for example, a display that displays data, a voice output device that outputs data in terms of speech or the like, or a printer that prints data.

The data regarding a data output request may be obtained by receiving it from, for example, the portable terminal 20, or from somewhere other than the controller 10 and the portable terminal 20. In the latter case, to be more specific, the following configuration may be possible. An acquiring device is provided that is communicably connected, via a network, to a data accumulating terminal to acquire data regarding a data output request from the data accumulating terminal. The output device 13 outputs the data acquired by the acquiring device to an output terminal selected by the selecting device 12.

With this arrangement, upon receipt of a data output request from the portable terminal 20, the acquiring device acquires data regarding the data output request from the data accumulating terminal, and the output device 13 outputs the acquired data to the output terminal 21 selected by the selecting device 12.

Furthermore, according to the data output controller 10 in accordance with another aspect of the present invention, as shown in FIG. 1, in the data output controller 10, the output terminal information includes data on an output terminal position that identifies the location where the output terminal 21 is installed, and the search data may include data on a portable terminal position that identifies the position of the portable terminal 20. The selecting device 12 retrieves the data on an output terminal position from the storage device 11 on the basis of the data on a portable terminal position contained in the search data, thereby selecting an output terminal 21 considered to be the closest distance-wise or time-wise, taking the position of the portable terminal 20 as the reference.

With this arrangement, if the search data includes the data on a portable terminal position, then the data on an output terminal position in the storage device 11 is retrieved by the selecting device 12 on the basis of the data on a portable terminal position that is contained in the data output request, and the output terminal 21 considered to be the closest distance-wise or time-wise is selected, taking the position of the portable terminal 20 as the reference.

In this case, the selecting device 12 may have any configuration as long as it is adapted to select an output terminal 21 considered to be the closest distance-wise or time-wise, taking the position of the portable terminal 20 as the reference. The selecting device 12 may be adapted to select any one of the output terminals 21 considered to be the closest distance-wise or time-wise, taking the position of the portable terminal 20 as the reference, or to select a plurality of the output terminals 21 considered to be the closest distance-wise or time-wise, taking the position of the portable terminal 20 as the reference. In the latter case, some method/device, such as designation by a user, is employed to narrow down to eventually select one of the plurality of output terminals 21.

The data on a portable terminal position may be obtained, for example, by measuring the position of the portable terminal 20 by the controller 10, or by measuring the position thereof by the portable terminal 20 by utilizing GPS or the like, or by measuring the position of the portable terminal 20 at a base station to which the portable terminal 20 is connected.

Furthermore, according to the data output controller 10 in accordance with another aspect of the present invention, as shown in FIG. 1, in the data output controller 10, the output terminal information includes data on an output terminal position that identifies a location where the output terminal 21 is located, and the search data may include data on a desired providing area that indicates a desired providing area, which is an approximate place where output data is desired to be provided. Based on the data on a desired providing area, which data is included in the search data, the selecting device 12 retrieves the data on an output terminal position from the storage device 11 to thereby select the output terminal 21 located in the area specified by the data on a desired providing area.

With this arrangement, if the search data includes the data on a desired providing area, then the data on an output terminal position in the storage device 11 is retrieved by the selecting device 12 on the basis of the data on a desired providing area that is contained in a data output request, and the output terminal 21 located in the area specified by the data on a desired providing area is selected.

In this case, the selecting device 12 may have any configuration as long as it is adapted to select an output terminal 21 located in the area specified by the data on a desired providing area. The selecting device 12 may be adapted to select any one of the output terminals 21 located in an area specified by the data on a desired providing area, or select all output terminals 21 located in an area specified by the data on a desired providing area. In the latter case, some method/device, such as designation by a user, is used to narrow down to eventually select one of the plurality of output terminals 21.

Furthermore, according to the data output controller 10 in accordance with another aspect of the present invention, as shown in FIG. 1, in the data output controller 10, the selecting device 12 does not perform the search based on the data on a portable terminal position if the position specified by the data on a portable terminal position is not included in the area specified by the data on a desired providing area that is included in the search data.

With this arrangement, the search based on the data on a portable terminal position will not be performed by the selecting device 12 if the position specified by the data on a portable terminal position is not included in the area specified by the data on a desired providing area that is included in the search data.

Furthermore, according to the data output controller 10 in accordance with another aspect of the present invention, as shown in FIG. 1, in the data output controller 10, the output terminal information includes output format data indicating a data format that can be output by the output terminal 21 among the data formats of the data regarding a data output request, and the search data may include the output format data. The selecting device 12 is adapted to retrieve output format data from the storage device 11 on the basis of the output format data included in the search data, and to select the output terminal 21 associated with the output format data.

With this arrangement, if output format data is included in search data, then the selecting device 12 retrieves output format data in the storage device 11 on the basis of the output format data included in a data output request, and selects the output terminal 21 associated with the output format data.

In this case, the selecting device 12 may have any configuration as long as it is adapted to select an output terminal 21 associated with output format data. The selecting device 12 may be adapted to select any one of the output terminals 21 associated with output format data, or select all output terminals 21 associated with output format data. In the latter case, some method/device, such as designation by a user, is used to narrow down to eventually select one of the plurality of output terminals 21.

Furthermore, according to the data output controller 10 in accordance with another aspect of the present invention, as shown in FIG. 1, in the data output controller 10, the output terminal information includes output specification data indicating the output specification of the output terminal 21, and the search data may include the output specification data. The selecting device 12 is adapted to retrieve output specification data from the storage device 11 on the basis of the output specification data included in the search data, and to select the output terminal 21 associated with the output specification data.

With this arrangement, if output specification data is included in search data, then the selecting device 12 retrieves output specification data in the storage device 11 on the basis of the output specification data included in a data output request, and selects the output terminal 21 associated with the output specification data.

In this case, the selecting device 12 may have any configuration as long as it is adapted to select an output terminal 21 associated with output specification data. The selecting device 12 may be adapted to select any one of the output terminals 21 associated with output specification data, or select all output terminals 21 associated with output specification data. In the latter case, some method/device, such as designation by a user, is used to narrow down to eventually select one of the plurality of output terminals 21.

Furthermore, according to the data output controller 10 in accordance with another aspect of the present invention, as shown in FIG. 1, in the data output controller 10, the output terminal information includes output terminal identifying data to identify the output terminals 21, and the search data may include the output terminal identifying data. The selecting device 12 is adapted to retrieve output terminal identifying data from the storage device 11 solely on the basis of the output terminal identifying data included in the search data, and to select the output terminal 21 that coincides with the output terminal identifying data.

With this arrangement, if search data includes output device identifying data, then the selecting device 12 does not perform search based on any data other than output device identifying data among the search data. The selecting device 12 retrieves output device identifying data from the storage device 11 solely on the basis of the output device identifying data included in the data output request so as to select the output terminal 21 that coincides with the output device identifying data.

Furthermore, according to the data output controller 10 in accordance with another aspect of the present invention, as shown in FIG. 1, in the data output controller 10, the output device 13 outputs output terminal information corresponding to the output terminal 21 selected by the selecting device 12 to the portable terminal 20.

With this arrangement, the output terminal information corresponding to the output terminal 21 selected by the selecting device 12 is output by the output device 13 to the portable terminal 20.

An embodiment in accordance with the present invention will now be described with reference to FIG. 2 through FIG. 6, which illustrate the embodiment of the data output controller in accordance with the present invention.

Figure 2:
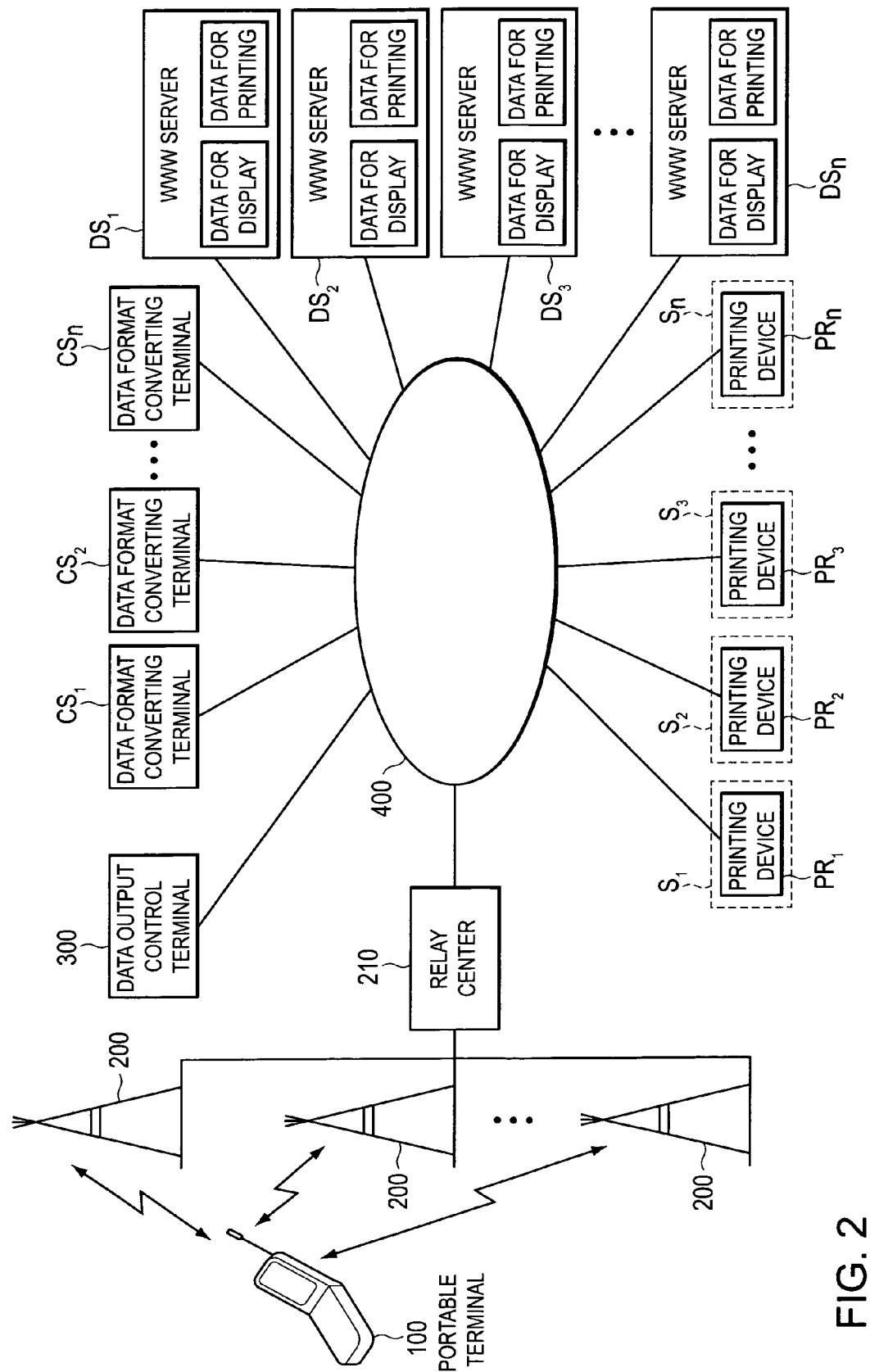
FIG. 2 is a schematic showing the configuration of a network system to which the data output controller in accordance with the present invention is applied.

This embodiment illustrates a case where the data output controller in accordance with the present invention is applied to a service wherein, in response to a data printing request from a user, a service provider acquires the data regarding the data print request from one of WWW (World Wide Web) servers $DS_1$ through $DS_m$ and outputs the data to one of the printing devices $PR_1$ through $PR_n$ by using a data output control terminal 300 communicably connected to a portable terminal 100, such as a portable telephone, possessed by a user, and printing devices $PR_1$ through $PR_n$ respectively installed at a plurality of shops $S_1$ through $S_n$ distributed at various locations via the Internet 400, as shown in FIG. 2. For easier understanding of the present invention, only one portable terminal 100 is shown. However, a plurality of different types of portable terminals 100 can be connected to the Internet 400 in practical applications.

First, the structure of a network system to which the data output controller in accordance with the present invention is applied will be described with reference to FIG. 2. FIG. 2 is a schematic showing the structure of the network system to which the data output controller in accordance with the present invention is applied.

As shown in FIG. 2, connected to the Internet 400 are a relay center 210 linking the communication between the portable terminal 100 and the Internet 400, the printing devices $PR_1$ through $PR_n$ that print data, the WWW servers $DS_1$ through $DS_m$ that accumulate data, the data output control terminal 300 that acquires data regarding a data printing request from one of the WWW servers $DS_1$ through $DS_m$ and outputs the data to one of the printing devices $PR_1$ through $PR_n$, and data format converting terminals $CS_1$ through $CS_l$ that convert the data acquired by the data output control terminal 300 into data that can be printed by the printing devices $PR_1$ through $PR_n$.

A plurality of base stations 200 that perform radio communication with the portable terminal 100 are connected to the relay center 210. When the portable terminal 100 is connected to the Internet 400, the relay center 210 serves as one terminal on the Internet 400 on behalf of the portable terminal 100 to thereby transmit the data received from the portable terminal 100 via the base stations 200 to a target terminal via the Internet 400, and also to transmit the data of a target terminal on the Internet 400 to the portable terminal 100 via the base stations 200. The portable terminal 100 simultaneously communicates with at least three base stations 200. The relay center 210 is adapted to measure the difference in time required for radio waves from the portable terminal 100 to reach the base stations 200, thereby measuring the position of the portable terminal 100 on the basis of the measured time differences.

The WWW servers $DS_1$ through $DS_m$ are constructed by a memory that stores display data for display on the portable terminal 100 and the print data to be printed by the printing devices $PR_1$ through $PR_n$ corresponding to the display data, and a request processing unit that responds to a request from a terminal, such as a relay center 210 or the data output control terminal 300, that is connected to the Internet 400 and transmits data from the memory to the terminal.

The request processing unit has a function implemented by a CPU, not shown, that executes a program stored in an external memory or the like. The request processing unit transmits display data or print data in the memory upon request to send data received from an external terminal (the portable terminal 100, the data output control terminal 300, etc.). Whether the display data or the print data should be sent is determined by a URL included in the request to send data. The memory stores a variety of files, as print data, including text data, still image data, sound data, animation data such as MPEG, 3D image data such as VRML, or program data or the like, such as JAVA, or HTML (Hyper Text Markup Language) files.

The data format converting terminals $CS_1$ through $CS_l$ are terminals that implement the data format conversion processing to convert the data acquired by the data output control terminal 300 into data that can be printed by the printing devices $PR_1$ through $PR_n$. One or a plurality of the data format converting terminals $CS_1$ through $CS_j$ is selected according to the transmission load of the Internet 400 or the processing load of a data format converting terminal CS. The data format conversion processing is performed by the selected data format converting terminal or terminals CS. To be more specific, one or a plurality of the data format converting terminals $CS_1$ through $CS_j$ that are required for data format conversion processing are selected according to the transmission load of the Internet 400 or in an ascending order of the magnitude of the processing load of the data format conversion terminals CS.

The data format converting terminal or terminals CS performing the data format conversion processing receive a request for converting a data format from the data output control terminal 300 and the data to be converted. Then, the data format converting terminal or terminals CS convert, by the data format conversion processing, the data in a predetermined format among the data acquired by the data output control terminal 300 into data that can be printed by a corresponding one of the printing devices $PR_1$ through $PR_n$, and send the converted data to the data output control terminal 300.

For instance, when data format converting terminals $CS_1$ through $CS_3$ are implementing the format conversion processing, the data format converting terminal $CS_1$ converts the data in a predetermined format A (e.g., HTML format) among the data acquired by the data output control terminal 300 into data that can be printed by the printing devices $PR_1$ through $PR_5$. The data format converting terminal $CS_2$ converts the data in a predetermined format B (e.g., JPEG format) among the data acquired by the data output control terminal 300 into data that can be printed by printing devices. $PR_6$ through $PR_{10}$. The data format converting terminal $CS_3$ converts the data in a predetermined format C (e.g., WORD (registered trade name) document format) among the data acquired by the data output control terminal 300 into data that can be printed by printing devices $PR_{11}$ through $PR_{15}$. In this case, apparently, the printing devices $PR_1$ through $PR_5$ are the devices dedicated to print the data in the predetermined data format A, the printing devices $PR_6$ through $PR_{10}$ are the devices dedicated for printing the data in the predetermined data format B, and the printing devices $PR_{11}$ through $PR_{15}$ are the devices dedicated for printing the data in the predetermined data format C.

The data format converting terminal or terminals CS performing the data format conversion processing convert the data acquired by the data output control terminal 300, and also generate preview data which can be displayed on the portable terminal 100 and which is an image showing how the data acquired by the data output control terminal 300 would look when it is printed out by a printing device PR, the preview data being generated according to a display function (the number of lines that can be displayed, a display resolution, etc.). The generated preview data is sent to the data output control terminal 300.

Hence, the data output control terminal 300 sends a request to convert a data format and the data acquired from a WWW server DS to a data format converting terminal CS associated with a printing device PR that is to print out the data regarding a data print request. In response to this, the data output control terminal 300 receives the data, which can be printed by the printing device PR that is to print out the data, and preview data.

Figure 3:
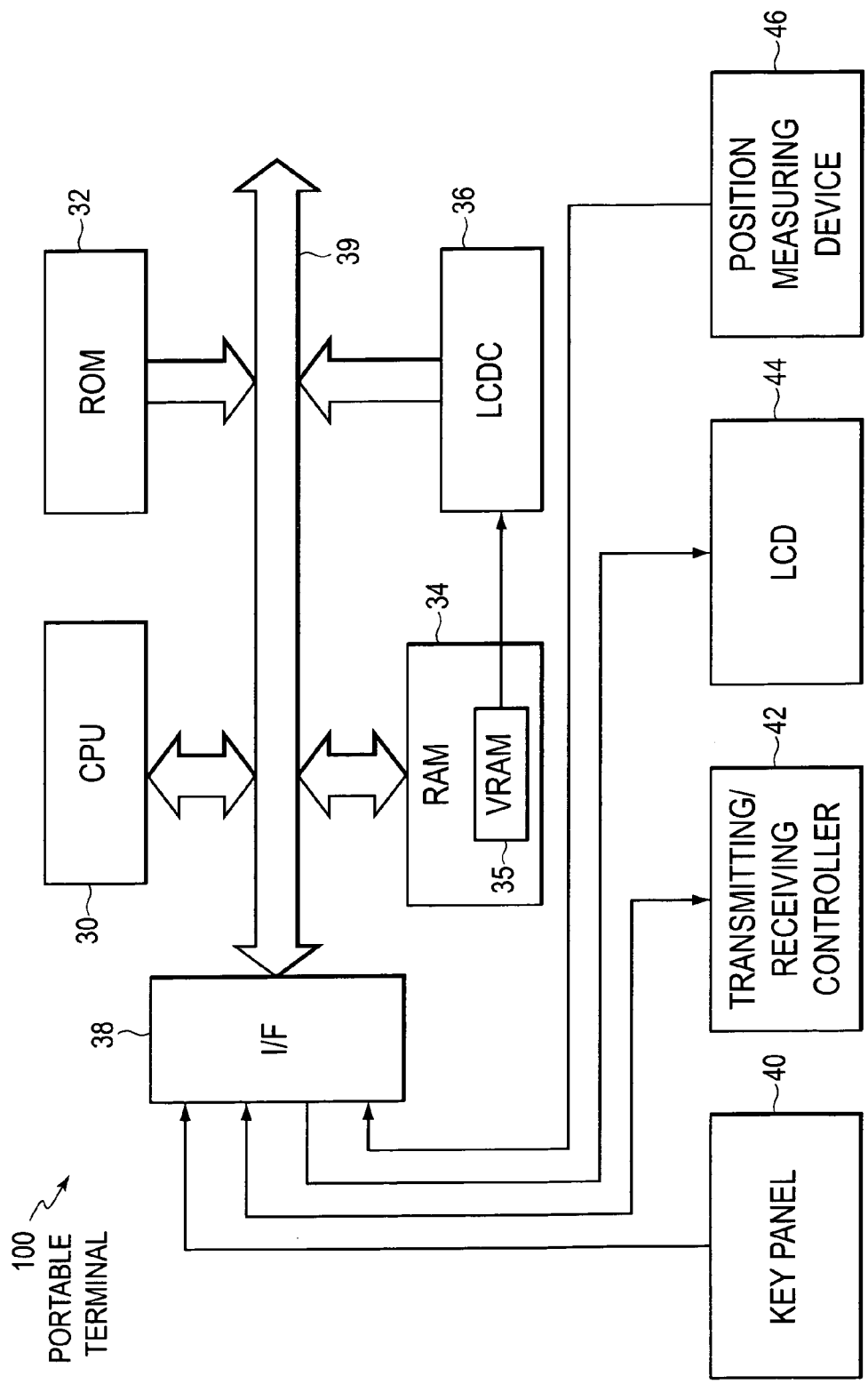
FIG. 3 is a schematic showing the configuration of a portable terminal 100.

The structure of the portable terminal 100 will now be described with reference to FIG. 3. FIG. 3 is a schematic showing the structure of the portable terminal 100.

Referring to FIG. 3, the portable terminal 100 is constructed by a CPU 30 that controls arithmetic operation and the entire system according to control programs, a ROM 32 that stores the control program or the like of the CPU 30 at a predetermined area beforehand, a RAM 34 that stores data read out from the ROM 32 or the like and the results of arithmetic operations required in the process of arithmetic operations performed by the CPU 30, an LCDC (Liquid Crystal Display Controller) 36 that converts data stored in a particular area of the RAM 34 into an image signal and outputs the image signal to an LCD (Liquid Crystal Display) 44, and an I/F 38 acting as an intermediary for input and output of data in relation to an external device. These components of the portable terminal 100 are interconnected by a bus 39, which is a signal line that transfers data, so as to permit data transfer among them.

External devices connected to the I/F 38 include a key panel 40 acting as a human interface to allow input of data through a plurality of keys, a transmitting/receiving controller 42 that communicates with a base station 200 via radio waves, an LCD 44 that displays a screen on the basis of image signals, and a position measuring device 46 that measures the position of a current location.

The ROM 32 stores, in addition to the control program for the CPU 30, authentication data that verifies whether an access to a printing service provided by the data output control terminal 300 is made by an authorized user.

The RAM 34 has a VRAM 35, as a specific area, that stores display data for display on the LCD 44. The VRAM 35 has access to the CPU 30 and the LCDC 36 independently.

The LCDC 36 sequentially reads out the display data stored in the VRAM 35 at a predetermined cycle, beginning with a leading address, converts the read display data into image signals, and outputs the image signals to the LCD 44.

The position measuring device 46 utilizes GPS (Global Positioning System) or the like, and receives a time signal from an orbiting satellite that sends a time signal indicating the current time to thereby measure the position of a current location on the basis of a time difference indicated by the time signal and also the orbit of each orbiting satellite.

Figure 4:
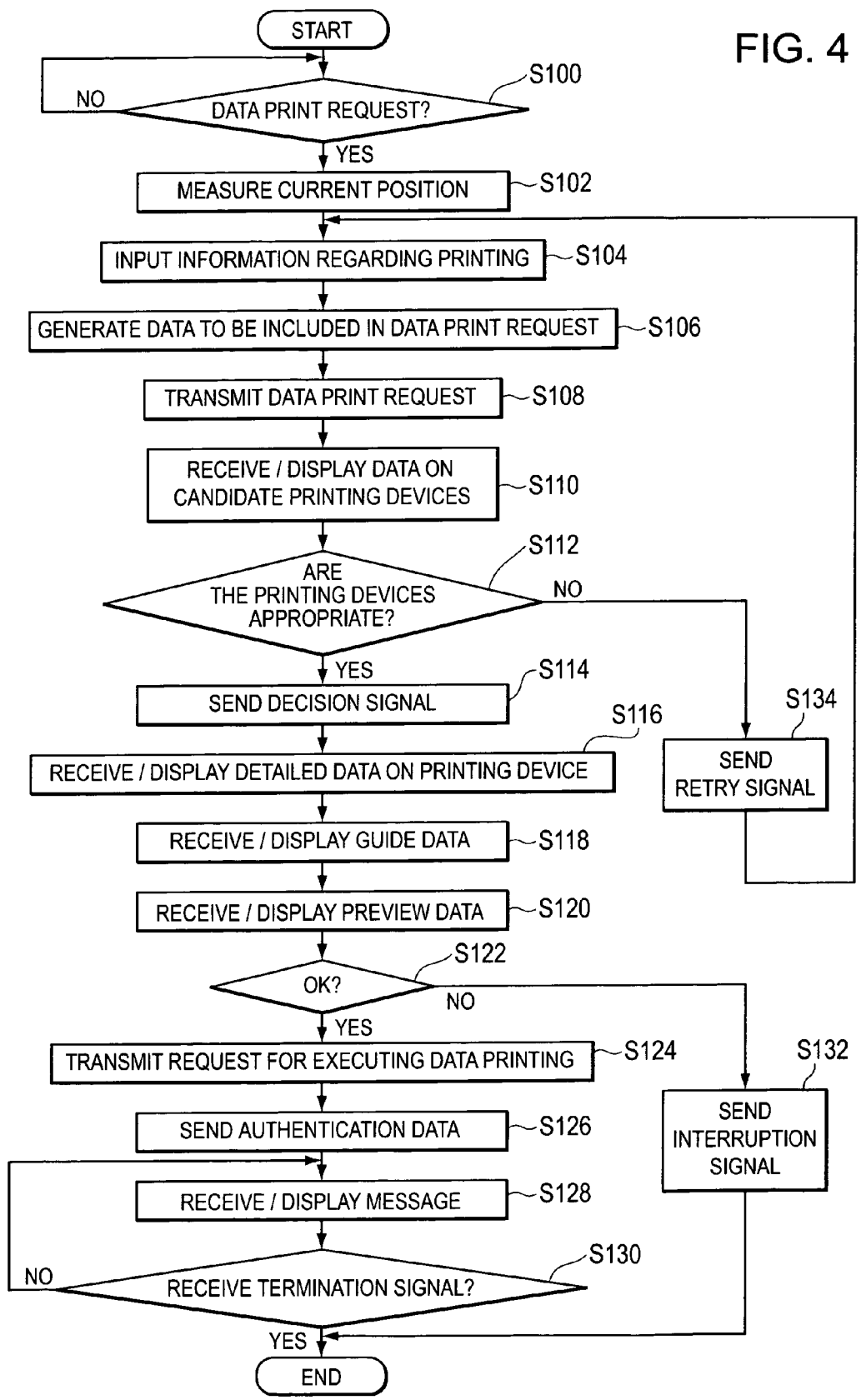
FIG. 4 is a flowchart showing the processing for a data print request.

The CPU 30 is formed primarily of a microprocessing unit MPU, and starts a predetermined program stored in a predetermined area of the ROM 32 to implement the data print request processing shown by the flowchart shown in FIG. 4. FIG. 4 is a flowchart showing the data print request processing.

The data print request processing is the processing in which a data print request is issued to the data output control terminal 300 to thereby make a request asking to print the data from a WWW server DS specified by a user by using one of the printing devices $PR_1$ through $PR_n$. When the data print request processing is implemented by the CPU 30, the program first goes to step S100, as shown in FIG. 4.

In step S100, it is determined whether there is a data print request by an input by a user through the key panel 40, and if it is determined that there is a data print request (Yes), then the program proceeds to step S102 wherein the position of a current location is measured by the position measuring device 46, and proceeds to step S104 wherein various pieces of information regarding printing are entered through the key panel 40. As the various pieces of information regarding printing, the user enters, for example, a URL that uniquely specifies the position, on the Internet 400, of the WWW server DS that stores the printing data to be printed, a desired providing area that is an approximate desired place that provides output data, a paper size, the designation of color or monochrome printing, printing accuracy or printing speed or other printing specifications of a printing device PR, a data format for print data to be printed out, or a printing device ID that identifies the printing device PR when directly specifying the printing device PR. None of these input items are indispensable, and the input items are selectively entered according to users' needs. However, regarding the URL of a WWW server DS, the URL of the WWW server DS currently being accessed by a user through the portable terminal 100 is automatically entered unless otherwise specified.

Then, the program proceeds to step S106 wherein it generates data to be included in the data print request on the basis of the various pieces of information regarding printing that have been entered. More specifically, in generating the data print request, the position of a current location that has been measured in step S102 is included as the data on the position of a portable terminal for determining the position of the current location. The URL of a WWW server DS is included as the data on the position where an object to be printed is stored, the data indicating the URL. If a desired providing area is entered, then the data on a desired providing area is included as the data indicating the desired providing area. If a printing specification for a printing device PR is entered, then the data on printing specification is included as the data indicating the printing specification. If a data format is entered, then printing format data is included as the data indicating the data format. If a printing device ID of a printing device PR is entered, then printing device identifying data is included as the data indicating the ID of the printing device.

Then, the program proceeds to step S108 wherein the data print request is sent to the data output control terminal 300, and proceeds to step S110 wherein the program receives, in response, from the data output control terminal 300 the data on candidate printing devices that shows the list of several candidates of printing devices PR considered to be optimum for a user to receive provided output data. Based on the received data on the candidate printing devices, the program displays the listed candidate printing devices PR on the LCD 44, then proceeds to step S112.

In step S112, the program determines whether there is a printing device PR that is desired to provide output data among the candidate printing devices PR displayed on the LCD 44. If one of the printing devices PR displayed on the LCD 44 is selected through the key panel 40, then it is determined that there is a printing device PR that is desired to provide output data (Yes), and the program proceeds to step S114.

In step S114, a decision signal indicating that a printing device PR has been decided is sent to the data output control terminal 300. The program then proceeds to step S116 wherein it receives, from the data output control terminal 300, the printing device information, which is the detailed information regarding the decided-on printing device PR (the place where the printing device PR is installed, the printing specifications of the printing device PR, etc.), as a first response to the transmitted decision signal. Based on the received printing device information, the program displays the detailed information regarding the printing device PR on the LCD 44, then proceeds to step S1118.

In step S118, the program receives guide data showing the guide information (route information, map information, etc.) that guides a user to the place where the decided-on printing device PR is installed from the position of the portable terminal 100. The guide data is received from the data output control terminal 300 as a second response to the transmitted decision signal. Based on the received guide data, the program displays the guide information on the LCD 44, then proceeds to step S120 wherein it receives preview data from the data output control terminal 300 as a third response to the transmitted decision signal. Based on the received preview data, the program displays the image, which would be obtained if the data were printed using the decided-on printing device PR, on the LCD 44, then proceeds to step S122.

In step S122, it is determined whether the printing data to be printed is correct by checking the image displayed on the LCD 44. If a selection is entered through the key panel 40 to indicate that the image displayed on the LCD 44 is correct and it is determined that the image displayed on the LCD 44 is correct (Yes), then the program proceeds to S124. At this time, if the preview data is formed of a plurality of pieces of data, then a particular piece of the preview data that is needed to be printed out can be specified.

In step S124, the program sends a request to implement data printing to the data output control terminal 300, and proceeds to step S126 wherein it transmits the authentication data in the ROM 32 to the data output control terminal 300. In response to the transmitted authentication data, the program receives a message from the data output control terminal 300, and displays the received message on the LCD 44 in step S128. The program then proceeds to step S130 wherein it determines whether a termination signal indicating the end of data printing has been received from the data output control terminal 300, and if it is determined that the termination signal has been received (Yes), then the program terminates the series of steps of the processing. If it is determined that the termination signal has not been received (No), then the program repeats step S128 until the termination signal is received.

If a selection is entered through the key panel 40 to indicate that the image displayed on the LCD 44 is incorrect, and if it is determined in step S122 that the image display on the LCD 44 is incorrect (No), then the program proceeds to step S132 wherein it transmits an interruption signal requesting the interruption of the data printing to the data output control terminal 300 to terminate the series of steps of the processing.

In step S112, if a selection is entered through the key panel 40 to indicate that no desired printing device PR is found among the candidates of printing devices PR displayed on the LCD 44, and if it is determined that there is no desired printing devices PR for providing output data (No), then the program proceeds to step S134 wherein it transmits a retry signal requesting re-search for a printing device PR considered to be optimum for receiving provided output data to the data output control terminal 300. The program then proceeds to S104.

If it is determined in step S100 that there is no data print request from a user (No), then the program stands by in step S100 until the data print request is received.

Figure 5:
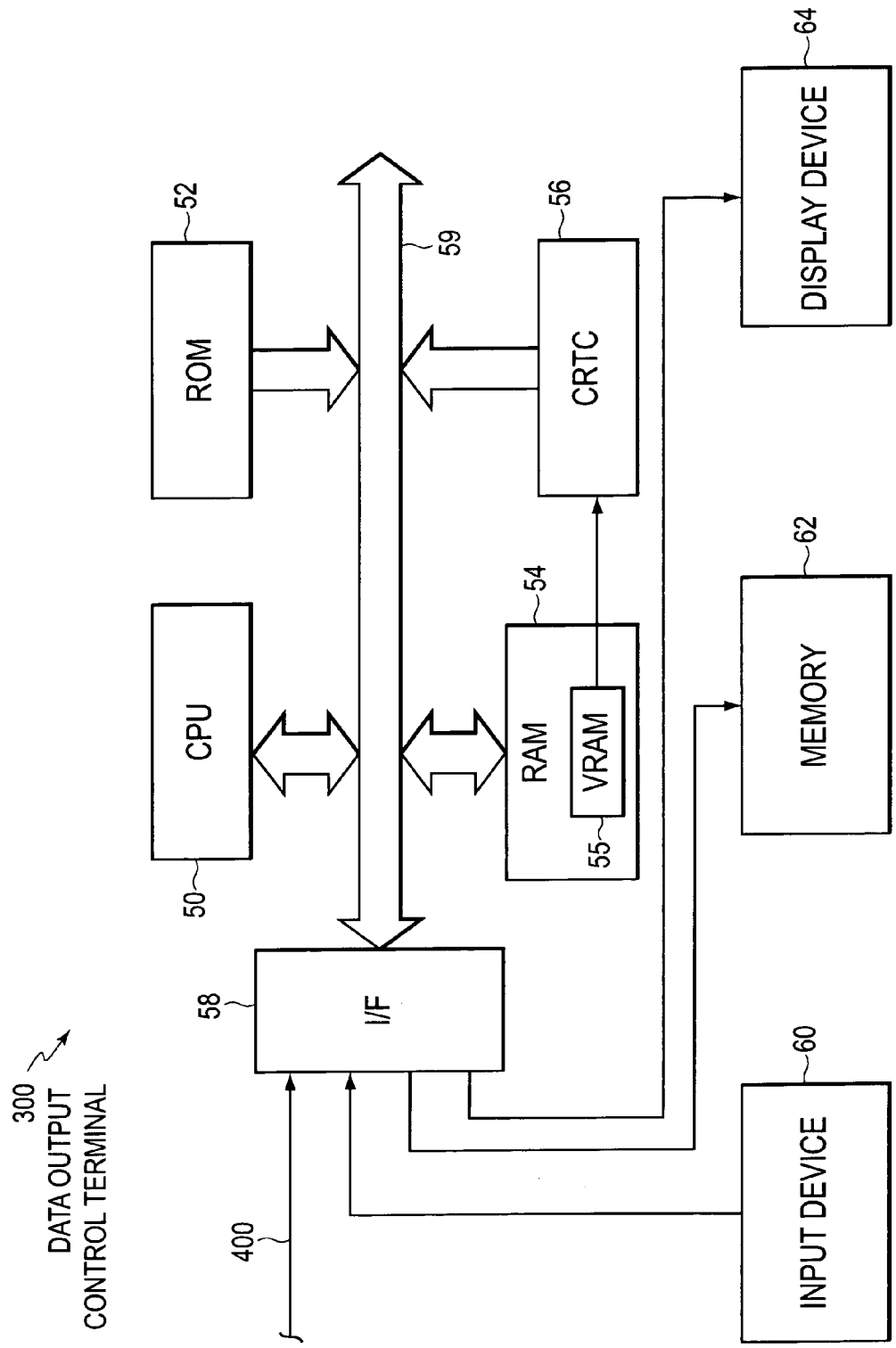
FIG. 5 is a schematic showing the configuration of a data output control terminal 300.

Referring now to FIG. 5, the structure of the data output control terminal 300 will be described. FIG. 5 is a block diagram showing the structure of the data output control terminal 300.

The data output control terminal 300 is adapted to acquire data on a data print request from the portable terminal 100, select one of the printing devices $PR_1$ through $PR_n$ to print out data, and output the acquired data to the selected printing device PR. As shown in FIG. 5, the data output control terminal 300 is constructed by a CPU 50 that controls arithmetic operations and the entire system according to control programs, a ROM 52 that stores the control programs or the like of the CPU 50 beforehand in a predetermined area, a RAM 54 that stores data read out from the ROM 52 or the like and the results of arithmetic operations required in the process of arithmetic operations performed by the CPU 50, a CRTC 56 that converts data stored in a particular area of the RAM 54 into an image signal and outputs the image signal, and an I/F 58 acting as an intermediary for input and output of data in relation to an external device. These components of the data output control terminal 300 are interconnected by a bus 59, which is a signal line for transferring data, so as to permit data transfer among them.

External devices connected to the I/F 58 include an input device 60 which acts as a human interface and is composed of a keyboard, mouse, etc. to permit input of data, a memory 62 for storing data, tables, etc. as files, a display device 64 for display using a screen on the basis of image signals, and a signal line for connection to the Internet 400.

The RAM 54 has a VRAM 55 for storing display data for display on the display device 64. The VRAM 55 has access to the CPU 50 and the CRTC 56 independently.

The CRTC 56 sequentially reads out the display data stored in the VRAM 55 at a predetermined cycle, beginning with a leading address, converts the read display data into image signals, and outputs the image signals to the display device 64.

The memory 62 stores printing device information regarding the printing devices PR required for selecting one of the printing devices $PR_1$ to $PR_n$ to print out data. The printing device information is formed by registering, for each of the printing devices $PR_1$ to $PR_n$, printing device position data for locating the places where the individual printing devices PR are installed, printing format data indicating data formats that permit conversion to be accomplished by data format converting terminals CS corresponding to the printing devices PR (i.e., the data formats in which the printing devices PR can print), printing specification data indicating the printing specifications of the printing devices PR, and printing device identifying data indicating the IDs of the printing devices.

Figure 6:
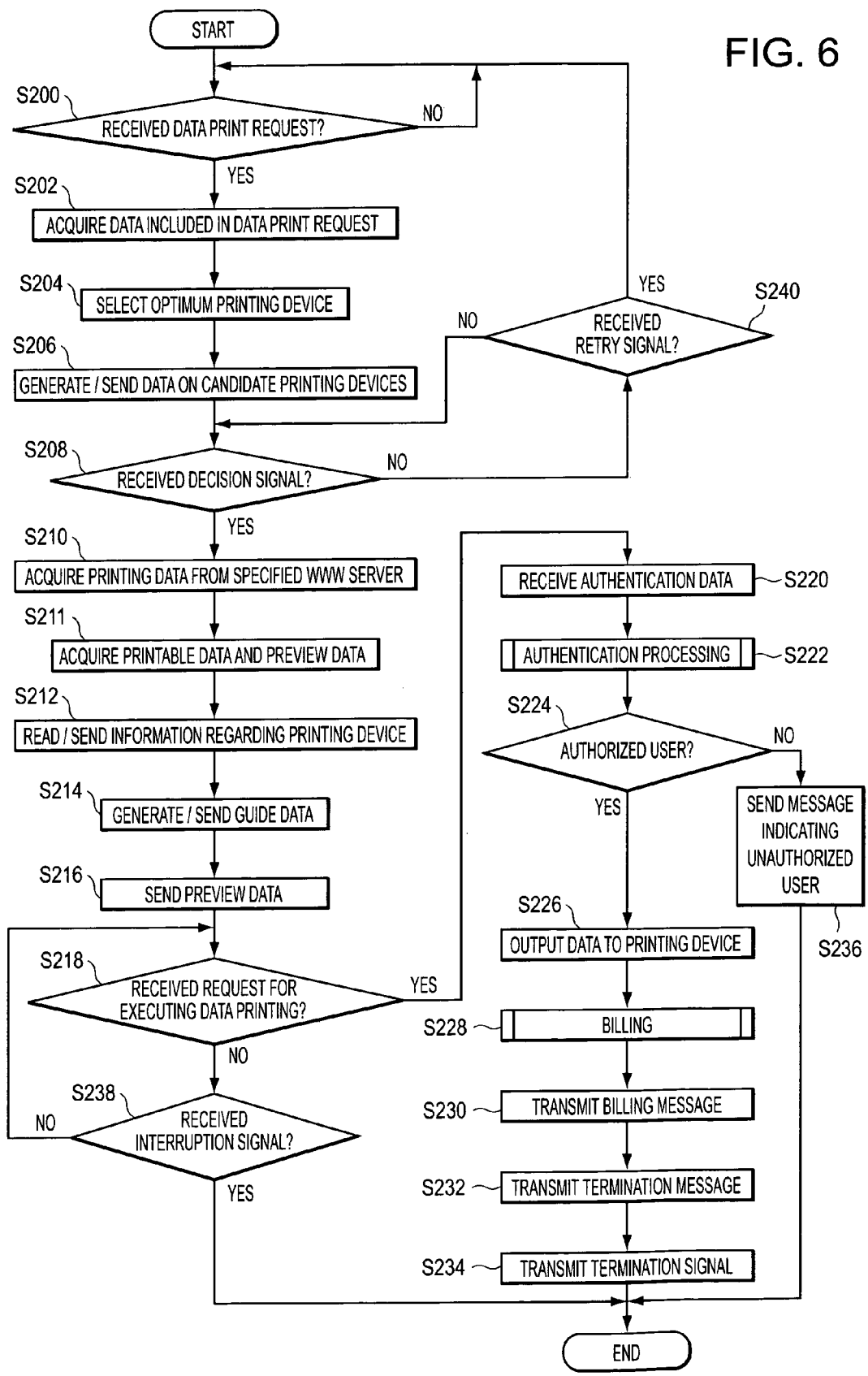
FIG. 6 is a flowchart showing data output control processing.

The CPU 50 is formed primarily of a microprocessing unit MPU, and starts a predetermined program stored in a predetermined area of the ROM 52 to implement the data output control processing indicated by the flowchart shown in FIG. 6. FIG. 6 is a flowchart showing the data output control processing.

The data output control processing is the processing in which printing data regarding a data print request from the portable terminal 100 is acquired from a WWW server DS, one of the printing devices PR that is considered to be the best suited for a user of the portable terminal 100 to receive provided output data is selected, and the acquired printing data is output to the selected printing device PR. When the data output control processing is implemented by the CPU 50, the program first goes to step S200, as shown in FIG. 6.

In step S200, it is determined whether a data print request has been received from the portable terminal 100, and if it is determined that the data print request has been received (Yes), then the program proceeds to step S202 wherein the program acquires data (at least the data on the position of the portable terminal and the data on the position where an object to be printed is stored) included in the received data print request. The program then proceeds to step S204 wherein it selects one of the printing devices PR that is considered to be the best suited for the user of the portable terminal 100 to receive provided output data.

In this step S204, specifically, the printing device position data in the memory 62 is retrieved on the basis of the acquired data on the position of the portable terminal so as to select some printing devices PR considered to be the closest distance-wise or time-wise, using the position of the portable terminal 100 as the reference. If the data print request includes the data on a desired providing area, then the printing device position data in the memory 62 is retrieved on the basis of the data on a desired providing area so as to select all printing devices PR located in an area specified by the data on a desired providing area. If the data print request includes printing specification data, then printing specification data in the memory 62 is retrieved on the basis of the acquired printing specification data so as to select all printing devices PR corresponding to the printing specification data.

Furthermore, if the data print request includes printing format data, then printing format data in the memory 62 is retrieved on the basis of the acquired printing format data so as to select all printing devices PR corresponding to the printing format data. If the data print request includes printing device identifying data, then printing device identifying data in the memory 62 is retrieved on the basis of the acquired printing device identifying data so as to select a printing device PR that coincides with the printing device identifying data. If the above data is mixed in a data print request in a compound fashion, then narrowing down is performed on the basis of each piece of data. However, if the data on a desired providing area is included, and if the position specified by the portable terminal position data is not included in the area specified by the data on a desired providing area, then no narrowing down on the basis of the portable terminal position data will be performed. Furthermore, if the printing device identifying data is included, then no narrowing down on the basis of any other data will be performed.

Subsequently, in step S204, the program generates printing device candidate data listing the printing devices PR selected in step S202, and sends the generated printing device candidate data to the portable terminal 100. The program then proceeds to step S208.

In step S208, the program determines whether a decision signal has been received from the portable terminal 100, and if the program determines that the decision signal has been received (Yes), then it proceeds to step S210 wherein it acquires printing data from a WWW server DS specified by a URL included in the acquired data on the position where an object to be printed is stored. The program then proceeds to step S211 wherein the program sends the acquired printing data to a data format converting terminal CS that is capable of converting the printing data and corresponds to the decided-on printing device PR. In response thereto, the program acquires data that can be printed by the decided-on printing device PR and preview data from the data format converting terminal CS, then proceeds to step S212.

In step S212, the program reads out the printing device information regarding the decided-on printing device PR from the memory 62, and sends the printing device information that has been read out to the portable terminal 100. The program then proceeds to step S214 wherein it generates guide data regarding the decided-on printing device PR, and sends the generated guide data to the portable terminal 100. Then, the program proceeds to step S216 wherein it sends the preview data to the portable terminal 100, and proceeds to step S218.

In step S218, the program determines whether a data print implementing request has been received from the portable terminal 100, and if it determines that the data print request has been received (Yes), then the program proceeds to step S220 wherein it receives authentication data from the portable terminal 100. The program then proceeds to step S222 wherein it performs verifying processing to verify whether the user of the portable terminal 100 is a user authorized to use the printing service provided by the data output control terminal 300 on the basis of the received authentication data. Thereafter, the program proceeds to step S224.

In step S224, the program determines whether the user of the portable terminal 100 is an authorized user from the result of the verifying processing in step S222, and if the program determines that the user is an authorized user (Yes), then it proceeds to step S226 wherein it sends the data that can be printed by the decided-on printing device PR to the printing device PR. The program then proceeds to step S228 wherein it implements billing based on the result of use, through the portable terminal 100, of the printing service provided by the data output control terminal 300.

In this step S228, specifically, the program calculates the charge for a call using the portable terminal 100 (e.g., the charge for a call on a one-minute increment basis), and also calculates the charge for using the service based on the result of the use through the portable terminal 100 by referring to a stipulated charge calculating table that shows established prices for using services as the prices to provide the printing services, such as, for example, the volume of acquired printing data, the number of pages printed by a printing device PR, and the printing specification of the printing device PR, which result from the use through the portable terminal 100. The calculated amount for using the services is added to the charge amount of the call, and the total amount resulting from the addition is stored as the amount to be invoiced to the user of the portable terminal 100.

Subsequently, the program proceeds to step S230 wherein the program sends the billing message indicating the amount of the charge for using the services that has been calculated by the billing in step S228 to the portable terminal 100. The program then proceeds to step S232 wherein it sends a termination message indicating that the printing of data has been completed to the portable terminal 100, then proceeds to step S234 wherein the program sends the termination signal to the portable terminal 100, thereby terminating the series of the steps of the processing.

If it is determined in step S224 that the user of the portable terminal 100 is not an authorized user (No), then the program proceeds to step S236 wherein it sends a message indicating that the user is unauthorized to the portable terminal 100, and terminates the series of the steps of the processing.

If it is determined in step S218 that the data print implementing request has not been received from the portable terminal 100 (No), then the program proceeds to step S238 wherein the program determines whether an interruption signal has been received from the portable terminal 100, and if it determines that the interruption signal has been received (Yes), then the program terminates the series of the steps of the processing, or if it determines that no interruption signal has been received (No), then the program proceeds to step S218.

If it is determined in step S208 that no decision signal has been received from the portable terminal 100 (No), then the program proceeds to step S240 wherein it determines whether a retry signal has been received from the portable terminal 100. If the program determines that a retry signal has been received (Yes), then it proceeds to step S200, or if the program determines that no retry signal has been received (No), then the program proceeds to step S208.

If it is determined in step S200 that no data print request has been received from the portable terminal 100 (No), then the program stands by in step S200 until a data print request is received.

The operation of the above embodiment will now be described.

First, when an authorized user who uses the printing service provided by the data output control terminal 300 operates the portable terminal 100 possessed by the user to access, for example, the WWW server $DS_1$, the display data of the WWW server $DS_1$ is displayed on the LCD 44. A case will be described as an example wherein, at this time, the user attempts to print out detailed data of the data displayed on the LCD 44.

To print out the target data, the user first enters a data print request through the key panel 40.

At the portable terminal 100, when the data print request is entered, the program goes through steps S100 and S102, and the CPU 30 causes the position measuring device 46 to measure the position of the current location. A request for inputting various pieces of information regarding printing is displayed on the LCD 44. At this point, when the user specifies and enters the URL of the WWW server $DS_1$, which the user is presently accessing, as the information regarding printing, the program implements steps S104 through S108 to generate data on the position of the portable terminal, and data on the position of an object to be printed is stored as the data to be included in a data print request on the basis of the entered information regarding printing. Then, the data print request is sent to the data output control terminal 300.

At the data output control terminal 300, upon receipt of the data print request, the program implements steps S200 through S204 and causes the CPU 50 to acquire the data (the data on the position of the portable terminal and the data on the position of the object to be printed out is stored) included in the received data print request. Based on the acquired data on the position of the portable terminal, the data on the positions of the printing devices is retrieved from the memory 62, and several printing devices PR considered to be located closest distance-wise or time-wise are selected, using the position of the portable terminal 100 as the reference. At this time, if the printing devices $PR_1$ through $PR_5$ are selected, then the program proceeds to step S206 wherein it generates the printing device candidate data listing the printing devices $PR_1$ through $PR_5$, and the generated printing device candidate data is sent to the portable terminal 100.

At the portable terminal 100, upon receipt of the printing device candidate data, the program implements step S110 to display the listed printing device $PR_1$ through $PR_5$ on the LCD 44 on the basis of the received printing device candidate data. At this point, if the user selects the printing device $PR_1$ through the key panel 40, then the program implements steps S112 and S114, and sends a decision signal indicating that the printing device $PR_1$ has been decided on to the data output control terminal 300.

At the data output control terminal 300, upon receipt of a decision signal, the program implements steps S208 through S211 to acquire printing data from the WWW server $DS_1$ specified by the URL included in the acquired data on the position where the object to be printed out is stored. The acquired printing data is transmitted to a data format converting terminal CS (e.g., the data format converting terminal $CS_1$) that is capable of converting the printing data and corresponds to the printing device $PR_1$ that has been decided on. In response to this, the data that can be printed out by the printing device $PR_1$ that has been decided on, and preview data are acquired from the data format converting terminal CSI. Then, the program implements steps S212 through S216 to read out the printing device information regarding the decided-on printing device $PR_1$ from the memory 62, send the information regarding the printing device that has been read out to the portable terminal 100, generate guide data on the decided-on printing device $PR_1$, send the generated guide data to the portable terminal 100, and send the preview data to the portable terminal 100.

At the portable terminal 100, upon receipt of the information regarding the printing device, the guide data, and the preview data, the program implements steps S116 through S1120 to display the detailed information regarding the printing device PR on the LCD 44 on the basis of the received information regarding the printing device, display the information regarding the guide from the position of the portable terminal 100 to the place, where the printing device $PR_1$ is installed, on the LCD 44 on the basis of the received guide data, and display, on the LCD 44, an image that would be obtained if the data were printed out by the decided-on printing device $PR_1$ on the basis of the received preview data. At this point, if a user enters, through the key panel 40, a selection indicating that the printing data that the user intends to print out coincides with the image displayed on the LCD 44, then the program implements steps S122 through S126 to send the data print implementing request and authentication data in the ROM 32 to the data output control terminal 300.

At the data output control terminal 300, upon receipt of the data print implementing request and the authentication data, the program implements steps S218 through S222 to perform the authentication processing based on the received authentication data. The user is a user authorized for using the printing service provided by the data output control terminal 300; therefore, the program implements S224 through S234 to send the data that can be printed by the decided-on printing device $PR_1$ to the printing device $PR_1$, perform billing, and send a billing message, a termination message, and a termination signal to the portable terminal 100.

At the portable terminal 100, upon receipt of the billing message, the termination message, and the terminal signal, the program repeatedly implements steps S128 and S130, and displays the billing message and the termination message on the LCD 44. At the printing device $PR_1$, upon receipt of the data that can be printed by the printing device $PR_1$, printing is performed on the basis of the received data.

After the termination message is displayed, the user refers to the guide information displayed on the LCD 44 to go to a store $S_1$ where the printing device $PR_1$ is installed so as to receive the data printed by the printing device $PR_1$. The charge for using the service as the price for the provided printing service will be added to the charge for a call made through the portable terminal 100 for billing.

A service provider will be able to obtain a consideration by billing the user with the sum of the charge amount for the use of the services to provide the printing service and the charge for a call.

If the user enters a desired providing area, which is an approximate place where the user wishes to provide the user with output data, as the information regarding the printing, then the data on a desired providing area that indicates the desired providing area is sent to the data output control terminal 300. At the data output control terminal 300, based on the acquired data on a desired providing area, the data on the positions of printing devices is retrieved from the memory 62 to select all printing devices PR located in the area specified by the data on a desired providing area.

For example, if a user enters "Shibuya" as the desired providing area, then all printing devices PR installed in the area around Shibuya will be displayed on the LCD 44 at the portable terminal 100.

If a user enters a printing specification for the printing devices PR as the information regarding printing, then the printing specification data indicating the printing specification is sent to the data output control terminal 300. At the data output control terminal 300, the printing specification data is retrieved from the memory 62 on the basis of the acquired printing specification data, and all printing devices PR corresponding to the printing specification data are selected.

For instance, if a user enters "color" as a printing specification, then all printing devices PR that are capable of printing out data in a color mode will be displayed on the LCD 44 at the portable terminal 100.

If a user enters a data format as the information regarding printing, then the printing format data indicating the data format is sent to the data output control terminal 300. At the data output control terminal 300, based on the acquired printing format data, the printing format data is retrieved from the memory 62, and all printing devices PR associated with the printing format data are selected.

For instance, if a user enters "HTML format" as a data format, then all printing devices PR with which the data format converting terminal CS that is capable of converting data in the HTML format is compatible are displayed on the LCD 44 at the portable terminal 100.

If the user enters a printing device ID of a printing device PR as the information regarding printing in order to directly specify a printing device PR, then printing device identifying data indicating the printing device ID is sent to the data output control terminal 300. At the data output control terminal 300, based on the acquired printing device identifying data, printing device identifying data is retrieved in the memory 62, and the printing device PR that coincides with the printing device identifying data is selected.

For example, if a user enters "0001" as a printing device ID, then the printing device PR whose printing device ID is "0001" is displayed on the LCD 44 at the portable terminal 100. At this time, if there is no printing device PR whose printing device ID is "0001", then no printing devices PR will be displayed.

If a user enters a desired printing area, a printing specification, and a data format in a compound fashion as the various pieces of information regarding printing, then the data indicating the above will be sent to the data output control terminal 300. At the data output control terminal 300, narrowing will be performed on the basis of the acquired plurality of pieces of data so as to select all printing devices PR associated with the data.

For example, if a user enters "Shibuya", "color", and "HTML format" as a desired printing area, a printing specification, and a data format, respectively, then all printing devices PR that are located in the neighborhood of Shibuya and capable of printing out data in a color mode among the printing devices PR with which a data format converting terminal CS capable of converting data in the HTML format is compatible will be displayed on the LCD 44 at the portable terminal 100.

If a user is not a user authorized to use the printing service provided by the data output control terminal 300, then even if the user enters, through the key panel 40, a selection indicating that an image displayed on the LCD 44 correctly indicates the printing data to be printed when the image is displayed on the LCD 44, the desired data will not be printed by the printing device $PR_1$.

Thus, according to the present embodiment, the data output control terminal 300 is adapted to select a printing device or devices PR considered to be optimum for a user of the portable terminal 100 to receive provided output data from among a plurality of printing devices PR.

Hence, users will be able to receive provided output data with greater ease and therefore to obtain detailed information available on the Internet 400 more easily. This enables a service provider to provide users thereof with information services that are highly satisfactory to the users, as compared with the conventional technology.

Furthermore, according to the embodiment, the data output control terminal 300 retrieves the data on the position of printing devices from the memory 62 on the basis of the data on the position of a portable terminal included in a data print request so as to select a printing device PR considered to be the closest distance-wise or time-wise, using the position of the portable terminal 100 as the reference.

Hence, the data regarding the data print request is printed out by the printing device PR considered to be the closest distance-wise or time-wise, using the position of the portable terminal 100 as the reference. This allows users to receive provided output data with greater ease and to obtain detailed information available on the Internet 400 more easily. Accordingly, a service provider will be able to provide information services that are even more satisfactory to the users thereof.

Furthermore, according to the embodiment, the data output control terminal 300 is adapted to retrieve data on the positions of printing devices from the memory 62 on a basis of data on a desired providing area that is included in a data print request so as to select a printing device PR located in an area specified by the data on a desired providing area.

Therefore, the data regarding the data print request will be printed out by the printing device PR located in the desired providing area, which is an approximate place where a user wishes to receive provided output data. Thus, output data can be provided in a manner that meets users' needs, and detailed information available on the Internet 400 can be obtained with even greater ease. Thus, a service provider will be able to provide information services that are even more satisfactory to the users thereof.

Furthermore, according to the embodiment, the data output control terminal 300 is adapted not to perform search based on the data on the position of a portable terminal if the position specified by the data on the position of a portable terminal is not included in the area specified by the data on a desired providing area included in a data print request.

Therefore, if a user inputs a desired providing area, then the priority is given to the search based on the data on the desired providing area rather than the search based on the data on the position of a portable terminal, and the data regarding a data print request will be printed out by a printing device PR located in the desired providing area. Thus, priority is given to the needs of the user in providing output data, allowing detailed information to be obtained from the Internet 400 with greater ease. Hence, a service provider will be able to provide information services that are more satisfactory to the users thereof.

Furthermore, according to the embodiment, the data output control terminal 300 is adapted to retrieve printing format data from the memory 62 on the basis of the printing format data included in a data print request so as to select a printing device PR compatible with the printing format data.

Accordingly, data regarding a data print request is printed out by a printing device PR capable of printing in a data format specified by a user. Thus, output data can be provided in a manner that meets users' needs, and detailed information available on the Internet 400 can be obtained with greater ease. Hence, a service provider will be able to provide information services that are more satisfactory to the users thereof.

Furthermore, according to the embodiment, the data output control terminal 300 is adapted to retrieve printing specification data from the memory 62 on the basis of the printing specification data included in a data print request so as to select a printing device PR compatible with the printing specification data.

With this arrangement, data regarding a data print request is printed out by a printing device PR capable of printing in accordance with the printing specification designated by a user. Thus, output data can be provided in a manner that meets users' needs, and detailed information available on the Internet 400 can be obtained with greater ease. Hence, a service provider will be able to provide information services that are more satisfactory to the users thereof.

Furthermore, according to the embodiment, the data output control terminal 300 is adapted to retrieve printing device identifying data from the memory 62 solely on the basis of the printing device identifying data included in a data print request thereby to select a printing device PR that coincides with the printing device identifying data.

With this arrangement, data regarding a data print request is printed out by a printing device PR uniquely specified by a user. Thus, output data can be provided in a manner that meets users' needs, and detailed information available on the Internet 400 can be obtained with greater ease. Hence, a service provider will be able to provide information services that are more satisfactory to the users thereof.

Furthermore, according to the embodiment, the data output control terminal 300 is adapted to output printing device information corresponding to a selected printing device PR to the portable terminal 100.

With this arrangement, a user is notified of the information regarding the printing device PR through which output data will be provided, making it possible to prevent the user from printing wrong data. Hence, a service provider will be able to provide information services that are more satisfactory to the users thereof.

Furthermore, according to the embodiment, the data output control terminal 300 is adapted to acquire data regarding a data print request from a WWW server DS.

With this arrangement, to print detailed information, print data and the data that can be printed using a printing device PR are processed by the data output control terminal 300. This obviates the need for memory expansion for the portable terminal 100 and also reduces the processing load on the portable terminal 100. In addition, since there is no need to read data into the portable terminal 100, the communication time will be shortened, leading to a shortened time required for output data to be provided. Hence, a service provider will be able to furnish users thereof with printing services with comfortable printing environments without depending on the functions of the portable terminal 100.

Furthermore, according to the embodiment, the data output control terminal 300 is adapted to select one from among a plurality of printing devices PR on the basis of data on portable terminal position that specifies the position of the portable terminal 100.

With this arrangement, data is printed out by a printing device PR associated with the position of the portable terminal 100. Hence, by selecting, for example, a printing device PR considered to be the closest distance-wise or time-wise based on the position of the portable terminal 100, a user will easily receive provided output data, and be able to obtain detailed information available on the Internet 400 with ease. Hence, a service provider will be able to provide information services that are more satisfactory to the users thereof.

Furthermore, according to the embodiment, the data output control terminal 300 is adapted to acquire data from a WWW server DS specified by a URL included in a data print request.

With this arrangement, detailed information available from all WWW servers DS connected to the Internet 400 can be obtained. Hence, a service provider will be able to provide information services that are more satisfactory to the users thereof.

Furthermore, according to the embodiment, the data output control terminal 300 is adapted to acquire printing data from a WWW server DS as the data regarding a data print request.

With this arrangement, general information is displayed on the portable terminal 100, while detailed information is printed by a printing device PR. This enables the portable terminal 100 to obtain detailed information available on the Internet 400 and also to achieve comfortable display processing. Hence, a service provider will be able to provide information services that are more satisfactory to the users thereof and to provide printing services in even more comfortable printing environments.

Furthermore, according to the embodiment, the data output control terminal 300 is adapted to send the preview data generated by a data format converting terminal CS to the portable terminal 100, and to output data regarding a data print request to a printing device PR when it receives a data print implementing request from the portable terminal 100 in response to the output of the preview data.

With this arrangement, a user will be provided with preview data on output data before the output data is provided, making it possible to prevent the user from printing out wrong data. Hence, a service provider will be able to provide information services that are more satisfactory to the users thereof.

Furthermore, according to the embodiment, the data output control terminal 300 is adapted to perform billing on the basis of the result of the use of the printing service provided by the data output control terminal 300 through the portable terminal 100.

With this arrangement, the billing amount for the use of services for provided printing services can be calculated in clarity. Moreover, it is not necessary to calculate the billing amount for the use of the services each time a printing service is provided. This enables a service provider to facilitate clerical job procedure to calculate the billing amounts in providing services, and also to provide the users thereof with even more satisfactory information services since service billing amounts are clearly indicated to the users.

Furthermore, according to the embodiment, the charge amount for the use of the services that provide the printing service is added to the charge amount for a call.

Thus, it is easier for users to pay for the use of the services, and also easier and securer for a service provider to collect the money for the use of the services. Moreover, the clerical job procedure for adjusting the charges of the use of the services will become easier.

Furthermore, according to the embodiment, the data output control terminal 300 is adapted to output data that has been converted by a data format converting terminal CS to a printing device PR.

With this arrangement, even if a new printing device PR is added, the setting of a data format converting terminal CS is required to be changed by a service provider for only the newly added printing device PR, and a user can use the newly added printing device PR without changing any setting. Hence, it is easier for a service provider to accomplish setting for an additional printing device PR, and the service provider will be able to provide information services that are more satisfactory to users thereof.

Furthermore, according to the embodiment, the data output control terminal 300 is adapted to send guide data to the portable terminal 100, the guide data showing guiding information that guides a user from the position of the portable terminal 100 to a place where a decided-on printing device PR is installed.

This allows the user to go to the place where the printing device PR is installed, according to the guiding information, so that the user can obtain output data relatively securely. Hence, a service provider will be able to provide information services that are more satisfactory to the users thereof.

Furthermore, according to the embodiment, regarding the data format converting terminals $CS_1$ to $CS_j$, one or a plurality of the data format converting terminals $CS_1$ to $CS_j$ are selected according to the transmission load of the Internet 400 or the processing load of a data format converting terminal CS, and data format conversion processing is implemented by a selected data format converting terminal CS.

With this arrangement, data format conversion processing is implemented by a data format converting terminal CS with a smaller transmission load of the Internet 400 or processing load. Therefore, the time required for output data to be provided will be approximately constant independently of the transmission load of the Internet 400 or the processing load of a data format converting terminal CS. Hence, a service provider will be able to provide users thereof with printing services in even more comfortable printing environments.

In the above embodiment, the printing device PR corresponds to the output terminal and the memory 62 corresponds to the storage device. Step S204 corresponds to the selecting device, step S226 corresponds to the output device, and step S212 corresponds to the output device.

In the above embodiment, the printing device PR corresponds to the output terminal, and the memory 62 corresponds to the storage device. Step S204 corresponds to the selecting device, step S226 corresponds to the output device, and step S212 corresponds to the output device.

The above embodiment has been configured so as to select, as the printing device PR considered to be the best suited for a user of the portable terminal 100 to receive provided output data, a printing device PR considered to be the closest distance-wise or time-wise, taking the position of the portable terminal as the reference, a printing device PR located in the area specified by the data on a desired providing area, a printing device PR corresponding to printing format data, a printing device PR corresponding to printing specification data, and a printing device PR that coincides with printing device identifying data; however, the present invention is not limited thereto. Further alternatively, for example, the embodiment may be configured so as to select a printing device PR considered to allow a user to receive provided output data most quickly time-wise, taking the data outputting speed of a printing device PR into account, or a printing device PR having a lowest price for provided output data.

In the former configuration, the data regarding a data print request is printed by a printing device PR considered to enable a user to receive provided output data most quickly time-wise, so that output data can be provided in a manner that meets users' needs, and detailed information available on the Internet 400 can be obtained with greater ease. Thus, a service provider will be able to provide information services that are more satisfactory to the users thereof.

In the latter configuration, the data regarding a data print request is printed by a printing device PR having a lowest price for provided output data, so that output data can be provided in a manner that meets users' needs, and detailed information available on the Internet 400 can be obtained with greater ease. Thus, a service provider will be able to provide information services that are more satisfactory to the users thereof.

Furthermore, the embodiment described above has been configured to have the printing device $PR_1$ through $PR_n$ for printing data so as to print data regarding a data print request from a portable terminal 100 by one of the above printing devices PR; however, the present invention is not limited thereto. For instance, the embodiment may alternatively be configured to have output devices that display data or output data in the form of speech or the like so as to output data regarding a data output request from a portable terminal 100 by using one of the output devices.

The embodiment described above has been configured to generate preview data by data format converting terminals CS; however, the present invention is not limited thereto. Alternatively, the embodiment may be configured to generate preview data by the data output control terminal 300.

In the embodiment described above, regarding the data format converting terminals $CS_1$ through $CS_l$, one or a plurality of the data format converting terminals $CS_1$ through $CS_l$ is selected according to the transmission load of the Internet 400 or the processing load of a data format converting terminal CS, and data format conversion processing is implemented by a selected data format converting terminal CS; however, the present invention is not limited thereto. The embodiment may alternatively be configured to implement data format conversion processing by a particular data format converting terminal.

The embodiment described above has been configured to implement the processing shown by the flowcharts of FIG. 4 and FIG. 6 by a particular data output control terminal 300; however, the present invention is not limited thereto. The embodiment may alternatively be configured to have a plurality of data output control terminals, as in the case of the data format converting terminals $CS_1$ through $CS_l$, so as to select one of the plurality of data output control terminals according to the transmission load of the Internet 400 or the processing loads of the data output control terminals, thus implementing the processing by the selected data output control terminal.

With this arrangement, the processing shown by the flowcharts of FIG. 4 and FIG. 6 is implemented by a data output control terminal having a smaller transmission load of the Internet 400 or processing load. Therefore, the time required for output data to be provided will be approximately constant independently of the transmission load of the Internet 400 or the processing load of a data output control terminal. Hence, a service provider will be able to provide printing services in even more comfortable printing environments.

In the above embodiment, the descriptions have been provided of the case where the data output controller in accordance with the present invention has been applied to the Internet 400; however, the present invention is not limited thereto. The present invention can be obviously applied to networks other than the Internet 400.

In the embodiment described above, the portable terminal 100, the data format converting terminals $CS_1$ through $CS_l$, the WWW servers $DS_1$ through $DS_m$, the printing devices $PR_1$ through $PR_n$, and the data output control terminal 300 are connected through the intermediary of the same network; however, the present invention is not limited thereto. Alternatively, the data output control terminal 300 and the portable terminal 100, the data output control terminal 300 and the data format converting terminals $CS_1$ through $CS_l$, the data output control terminal 300 and the WWW servers $DS_1$ through $DS_m$, and the data output control terminal 300 and the printing devices $PR_1$ through $PR_n$ may alternatively be connected through the intermediary of different networks, respectively.

In the above embodiment, the descriptions have been provided of the case where the control programs stored in the ROM 32 or 52 beforehand are executed to implement the processing shown by the flowcharts of FIG. 4 and FIG. 6; however, the present invention is not limited thereto. Alternatively, a program indicating the procedures may be read from a storage medium storing the program into the RAM 34 or 54 to execute the programs.

The storage medium in this case includes a semiconductor storage medium, such as a RAM or ROM, a magnetic storage type storage medium, such as an FD or HD, an optical reading type storage medium, such as CD, CDV, LD, or DVD, or a magnetic storage type/optical reading type storage medium, such as an MO. The storage media include all storage media as long as they are storage media that permit reading by computers, regardless of their reading methods, such as an electronic, magnetic, or optical reading method.

In the embodiment described above, the data output controller in accordance with the present invention has been applied to a case where a service provider provides a service in which, in response to a data print request from a user, the service provider acquires data regarding the data print request from one of the WWW servers $DS_1$ through $DS_m$ and outputs the acquired data to one of the printing devices $PR_1$ through $PR_n$ by using the data output control terminal 300, as shown in FIG. 2; however, the present invention is not limited thereto. The present invention can be also applied to other cases without departing from the spirit thereof.

The invention claimed is:

1. A data output controller that is communicably connected, via a network, to a portable terminal that is possessed by a user and that issues a data print request, and a plurality of output terminals that is distributed and installed at various locations to print data, receives a data print request from the portable terminal, and outputs data regarding the data print request to the output terminals, the data output controller comprising:

a storage device that stores output terminal information regarding the output terminals for each of the output terminals;

a selecting device that selects one of the plurality of output terminals;

a data format converting device that converts the output data into a format according to the output terminal information; and an output device that outputs the data regarding the data print request to the output terminal selected by the selecting device, the data print request including search data necessary for the selecting device to select the output terminal, and the selecting device retrieving output terminal information from the storage device on the basis of the search data contained in the data print request and on the basis of a capability of the data format converting device so as to select an output terminal considered to be the best suited for the user of the portable terminal to receive provided output data.

2. The data output controller according to claim 1, the output terminal information including data on an output terminal position to determine the location where the output terminal is installed, the search data including data on a portable terminal position to determine the position of the portable terminal, and the selecting device retrieving output terminal position data from the storage device on the basis of data on a portable terminal position contained in the search data, to thereby select an output terminal considered to be the closest distance-wise or time-wise, taking the position of the portable terminal as a reference.

3. The data output controller according to claim 1, the output terminal information including data on an output terminal position to determine a location where the output terminal is installed, the search data including data on a desired providing area that indicates a desired providing area, which is an approximate place where output data is desired to be provided, and the selecting device retrieving data on an output terminal position from the storage device on the basis of the data on a desired providing area included in the search data to thereby to select an output terminal located in an area specified by the data on a desired providing area.

4. The data output controller according to claim 3, the selecting device not performing search based on the data on a portable terminal position if the position specified by the data on a portable terminal position is not included in the area specified by the data on a desired providing area included in the search data.

5. The data output controller according to claim 1, the output terminal information including printing format data indicating a data format that can be printed by the output terminal among data formats of data regarding the data print request, the search data including the printing format data, and the selecting device retrieving printing format data from the storage device on the basis of the printing format data included in the search data, and selecting an output terminal associated with the printing format data.

6. The data output controller according to claim 1, the output terminal information including printing specification data indicating the printing specification of the output terminal, the search data including the printing specification data, and the selecting device retrieving printing specification data from the storage device on the basis of printing specification data included in the search data, and selecting an output terminal associated with the printing specification data.

7. The data output controller according to claim 1, the output terminal information including output terminal identifying data that identifies the output terminals, the search data including the output terminal identifying data, and the selecting device retrieving output terminal identifying data from the storage device solely on the basis of output terminal identifying data included in the search data, and selecting an output terminal that coincides with the output terminal identifying data.

8. The data output controller according to claim 1, the output device outputting output terminal information corresponding to an output terminal selected by the selecting device to the portable terminal.

9. A data output controller that is communicably connected, via a network, to a portable terminal that is possessed by a user and that issues a data output request, and a plurality of output terminals that are distributed and installed at various locations to output data, receives a data output request from the portable terminal, and outputs data regarding the data output request to the output terminals, the data output controller comprising:

a storage device that stores output terminal information regarding the output terminals for each of the output terminals;

a selecting device that selects one of the plurality of output terminals;

a data format converting device that converts the output data into a format according to the output terminal information, and an output device that outputs the data regarding the data output request to an output terminal selected by the selecting device, the data output request including search data necessary for the selecting device to select the output terminal, and the selecting device retrieving output terminal information from the storage device on the basis of the search data contained in the data output request and on the basis of a capability of the data format converting device so as to select an output terminal considered to be the best suited for the user of the portable terminal to receive provided output data.

10. The data output controller according to claim 9, the output terminal information including data on an output terminal position to determine the location where the output terminal is installed, the search data including data on a portable terminal position to determine the position of the portable terminal, and the selecting device retrieving data on an output terminal position from the storage device on the basis of the data on a portable terminal position contained in the search data, to thereby select an output terminal considered to be the closest distance-wise or time-wise, taking the position of the portable terminal as a reference.

11. The data output controller according to claim 9, the output terminal information including data on an output terminal position for determining a location where the output terminal is installed, the search data including desired providing area data that indicates a desired providing area, which is an approximate place where output data is desired to be provided, and the selecting device retrieving data on an output terminal position from the storage device on the basis of the data on a desired providing area included in the search data to thereby select an output terminal located in an area specified by the data on a desired providing area.

12. The data output controller according to claim 11,
the selecting device not performing a search based on data on a portable terminal position if the position specified by the data on a portable terminal position is not included in the area specified by data on a desired providing area included in the search data.

13. The data output controller according to claim 9,
the output terminal information including output format data indicating a data format that can be output by the output terminal among data formats of data regarding the data output request,
the search data including the output format data, and
the selecting device retrieving output format data from the storage device on the basis of the output format data included in the search data, and selecting an output terminal associated with the output format data.

14. The data output controller according to claim 9,
the output terminal information including output specification data indicating the output specification of the output terminal,
the search data including the output specification data, and
the selecting device retrieving output specification data from the storage device on the basis of output specification data included in the search data, and selecting an output terminal associated with the output specification data.

15. The data output controller according to claim 9,
the output terminal information including output terminal identifying data that identifies the output terminals,
the search data including the output terminal identifying data, and
the selecting device retrieving output terminal identifying data from the storage device solely on the basis of output terminal identifying data included in the search data, and selecting an output terminal that coincides with the output terminal identifying data.

16. The data output controller according to claim 9,
the output device outputting output terminal information corresponding to an output terminal selected by the selecting device to the portable terminal.

* * * * *